United States Patent

[11] 3,571,777

[72] Inventor Paul R. Tully
 Lowell, Mass.
[21] Appl. No. 839,555
[22] Filed July 7, 1969
[45] Patented Mar. 23, 1971
[73] Assignee Cabot Corporation
 Boston, Mass.
 Continuation-in-part of application Ser. No. 751,382, Aug. 9, 1968, now abandoned.

[54] THERMALLY RESPONSIVE CURRENT REGULATING DEVICES
 8 Claims, 1 Drawing Fig.

[52] U.S. Cl.................................................. 338/20,
 252/511, 338/22, 338/25
[51] Int. Cl....................................................... H01c 7/12
[50] Field of Search......................................... 252/511;
 338/13, 20, 22, 23, 25

[56] References Cited
 UNITED STATES PATENTS
 2,951,817 9/1960 Myers........................ 252/511

3,243,753 3/1966 Kohler........................ 338/22X
 3,351,882 11/1967 Kohler et al................. 252/511

OTHER REFERENCES

" Polymer Handbook" by J. Brandrup et al, Interscience Publishers, 1966, QD 281 P6B68 Scientific Library, p. III—72 relied on.

Primary Examiner—Richard A. Farley
Assistant Examiner—Malcolm F. Hubler
Attorneys—Kenneth W. Brown, Arthur S. Collins, Barry R. Blaker and Lawrence H. Chaletsky ABSTRACT: The present invention concerns thermally responsive current regulating devices comprising conductive polymeric compositions. Broadly, the devices of the invention comprise electrodes attached to a current controlling polymeric composition comprising a polymer and having dispersed therein the quantity of submicron sized particulate conductive filler. The electrical resistance of such devices varies substantially and reproducibly with variation in temperature through the glass transition temperature range of the polymeric constituent.

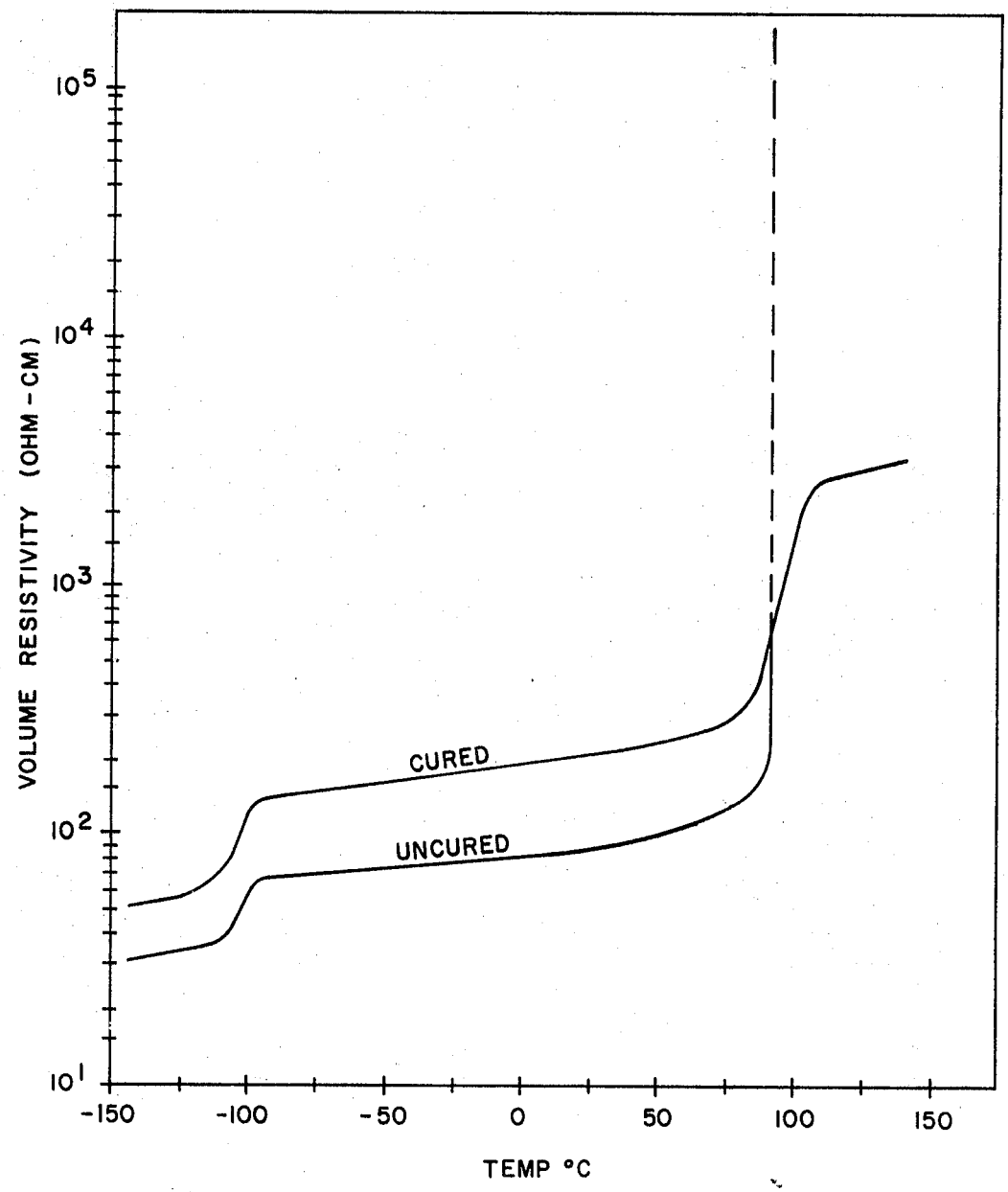

THERMALLY RESPONSIVE CURRENT REGULATING DEVICES

CROSS REFERENCES

This application is a continuation-in-part of application Ser. No. 751,382, filed Aug. 9, 1968, now abandoned, which in turn is a continuation-in-part of application Ser. No. 586,625, filed Oct. 14, 1966 now abandoned.

THE PRIOR ART

Polymeric compositions comprising a relatively crystalline polymeric material (such as high density polyethylene) having dispersed therein finely-divided conductive fillers, such as carbon black and exhibiting increasing electrical resistivity with rising temperatures are well known. In general, said compositions exhibit small increases in resistivity with increasing temperatures at below the crystalline melting point of the polymeric material. However, it is further known that at temperatures near or through the crystalline melting point of the crystalline polymeric material, substantially larger increases in electrical resistivity are realized in response to rising temperatures. These substantial increases in resistivity have recently been directly attributed to conversion of the polymeric crystallite phase to the amorphous melt phase. As said conversion progresses the conductive filler forming part of the composition tends to disperse or migrate into the newly formed amorphous phase regions of the polymeric material giving rise to larger average interparticle distances of the conductive filler and thus to substantially increased resistance of the composition. Conversely, upon cooling through the crystalline melting point, the reforming crystallites tend to expulse this dispersed filler into the intercrystallite regions of the polymeric material, thereby decreasing the average interparticle distance of the composition and thus affording decreased resistivity to the composition. Heretofore, the choice of suitable polymeric materials for use in thermally responsive current regulating devices has been restricted to materials that are (a) substantially crystalline and/or (b) capable of being cured. The latter limitation was of importance in producing a self-regulating device that was capable of continuous reuse since permanent deformation of an uncured polymeric composition often occurs upon heating thereof through the crystalline melting or softening point of the polymeric constituent. Exemplary literature relating to the control of current by use of polymeric materials loaded with conductive fillers are U.S. Pat. Nos. 3,243,753, Kohler, Mar. 29, 1966; 3,351,882, Kohler et al., Nov. 7, 1967 and 2,951,817, Myers, Sept. 6, 1960. In each of the Kohler and Kohler et al. patents, the polymeric materials utilized are cured or cross-linked subsequent to the incorporation therein of an electrically conductive filler. Said curing or cross-linking is accomplished to circumvent the aforedescribed deleterious phenomenon of melting or permanent deformation normally occuring during the use of such materials when the crystalline melting point or softening point of the polymeric material is exceeded. Indeed, it is at this temperature range at which the resistivity phenomenon is known to take place. Referring specifically to U.S. Pat. No. 3,243,753, Kohler succintly states the problem at Column 1, lines 20—25:

"Heretofore, it has been suggested that a resistance element could be made from plastics, mixed with conductive materials. However, in general, such materials have not been put to wide use. The plastic body often will melt during its use or the plastic will deteriorate at elevated temperatures."

In the Myers' patent, the problem of melting or deformation as a function of temperature is not normally encountered because the desired variation in resistivity of the polymeric material is achieved by physical rather than thermal stressing thereof. Accordingly, Myers does not make use of temperature/resistivity phenomena at all, but rather utilizes the well-known phenomenon of "recovery" exhibited by most polymeric materials when a physical strain is applied thereto and thereafter released.

In accordance with the present invention, however, polymeric compositions comprising finely-divided conductive fillers and polymeric materials which need not be cured or curable can be utilized in the production of current regulating devices.

OBJECTS OF THE INVENTION

It is a principal object of the present invention to provide improved thermally responsive current regulating devices.

It is another object of the present invention to provide polymeric compositions which, when utilized for regulating current, exhibit substantial increases in resistivity with rising temperatures.

Other objects and advantages of the present invention will in part be obvious and will in part appear hereinafter.

THE DRAWING

The drawing forming part hereof is a graphic representation of the temperature/resistivity characteristics of a particular conductive filler/polymeric composition over a range of temperatures from below the glass transition temperature to above the crystalline melting point temperature of the polymeric constituent of the composition.

GENERAL DESCRIPTION OF THE INVENTION

In accordance with the present invention, it has been discovered that polymeric compositions comprising a finely-divided conductive filler and a polymeric material generally possess a heretofore unknown temperature/resistivity regime existing at about the glass transition temperature of the polymeric material thereof. Use of said regime may be made in providing thermally controllable current regulating devices.

DETAILED DESCRIPTION OF THE INVENTION

Any polymer, copolymer or mixture thereof having a glass transition occuring at at least 10 percent below the softening or crystalline melting point thereof is suitable for the practice of the invention. With respect to crystalline polymers, the glass transition temperature will normally constitute a temperature residing at from about 60 to about 80 percent of the crystalline melting point thereof and, accordingly, will pose little or no problem of polymer selection from this standpoint. However, amorphous polymers often possess softening temperatures which reside within about 15° C. of the glass transition temperatures thereof. The term "softening temperature," as it relates to such polymer materials, is generally defined as that temperature at which no-load permanent deformation of a polymer occurs at rapid rates. In this context, therefore, it is to be noted that many amorphous polymers do not deform so rapidly at the glass transition temperature as to be nonuseful in the practice of the present invention. This is particularly true, of course, when reinforcing fillers, such as certain carbon blacks are utilized as or in consort with the electrically conductive fillers of the composition. Such fillers tend to stabilize the composition and effectively raise the softening temperature of the overall composition to significantly higher levels than the glass transition temperature of the polymer. Accordingly, for the purposes of the present invention, "softening" temperature refers to the softening temperature of the overall polymeric composition. Suffice it to say, therefore, that for the purposes of the present invention, the glass transition temperature of an amorphous polymeric material should be at least about 15° C. lower than the softening temperature of the overall composition. Furthermore, in accordance with the classic definition of the term, "glass transition" temperature is to be taken as that temperature at which a rigid ordered glass solid begins to collapse to an extremely viscous liquid or rubbery material. The following table provides a ready comparison of the glass transition temperatures and crystalline melting points or softening temperatures of several suitable polymeric materials:

TABLE

| Polymer | Tg, °C. | Crystalline melting point or softening point, °C. |
|---|---|---|
| Poly-m-methylstyrene | 72 | 82 |
| Polystyrene | 100 | 135 |
| Polyethylene (0.960 g/cc.) | −120 | 110-130 |
| Polymethylmethacrylate | 105 | 160 |
| Polymethylacrylate | 51 | 105 |
| Polyvinyl acetate | 28 | 76 |
| Butadiene-styrene copolymer (30/70) | 18 | 55 |
| Polyfluoropropylene | 11 | |
| Polyvinylchloride | 82 | 212 |
| Polymethacrylonitrile | 120 | |
| Polypropylene | −18 | 176 |
| Polytetrafluoroethylene | 126 | 327 |
| Polyvinylidene chloride | −17 | 150 |
| Polyvinylethylether | −25 | 86 |
| Polyhexamethylene adipamide | 50 | 250 |
| Polyhexamethylene sebacamide | 40 | 227 |
| Polycaprolactam | 50 | 215 |
| Polyvinylbutyral | 49 | |
| Polyethylene terephthalate | 69 | 265 |
| Poly-4-methyl pentene-1 | 18 | 250 |

Generally, any finely-divided electrically conductive solid having an average particle diameter of less than about 1 micron can comprise the filler material. For example, finely-divided powdered metals and/or metal alloys such as aluminum, copper, iron, nickel, chrome/nickel, iron/nickel, and the like are suitable. Preferred are carbon blacks such as thermal blacks, acetylene blacks, oil furnace blacks, gas furnace blacks and channel blacks. Especially preferred as fillers are the more electrically conductive carbon blacks such as acetylene blacks, furnace blacks and mixtures thereof. In addition, it should be noted that mixtures of finely-divided metals or metal alloys and carbon black can be utilized as conductive fillers.

The amount of electrically conductive filler contained in the polymeric composition can vary substantially depending upon the particular polymer utilized, the average particle size of the filler, the degree of dispersion of said filler, etc. In general, when carbon black comprises the filler, the presence of between about 10 and about 250 parts by weight of black per hundred parts of polymer will be sufficient. More preferred, however, is a polymeric composition comprising between about 20 and about 100 parts by weight of black per hundred parts of polymer.

As mentioned before, it is also important that the polymeric composition forming part of the devices of the present invention have a softening temperature considerably above, i.e. at least about 15° C. above, the glass transition temperature of the polymer material constituent. In those instances in which a partially crystalline polymer material is utilized the crystalline melting point thereof can also be conveniently regarded as the "softening" point. However, it is again pointed out and should be taken into account that the presence of fillers can markedly alter the softening temperature of the overall composition whether the polymeric material be crystalline, partially crystalline or essentially amorphous.

The dispersing of the finely-divided filler into the polymer can generally be achieved by any suitable method known in the art. For instance, the dispersion of the conductive filler can be accomplished by utilization of conventional internal and/or external mixing means such as extruders, a Banbury mixer, roll mills and the like.

Fabrication of the polymeric composition to produce the desired shape can be accomplished in any suitable manner. Examples of techniques well known to the art and which are entirely suitable in accordance with the present invention are compression molding, extrusion, blow molding, injection molding, vacuum forming, solution casting and the like.

The type of electrical current that can be utilized in accordance with, and regulated by, the devices of the present invention is generally not critical. For example, alternating current, direct current, pulsating direct current and the like can all be regulated by the devices of the present invention. Moreover, the voltage and the current that can be utilized with the devices of the present invention can vary greatly depending to a large extent upon the glass transition temperature region and resistivity of the polymer, the resistivity of the circuitry, the volume of composition through which the current passes, etc. Therefore, the voltage and current that can be utilized in accordance with the present invention is best determined for any specific situation bearing the above considerations in mind. Said requirements are well understood by those skilled in the art and need no further discussion here.

The current regulating devices of the invention are thermally responsive. Accordingly, in order that such responses be realized during operations it is important that means be associated with the device to regulate the temperature thereof to within the glass transition temperature range. In previous paragraphs I have treated the glass transition temperature as a single point temperature for purposes of convenience. However, it will be readily appreciated by those skilled in the art that the glass transition phenomenon, as applied to polymeric materials, generally encompasses a range of temperatures and that glass transition temperatures generally recited in the literature are normally means temperatures taken at about midpoint in the transition range. Thus, in reality, polymeric glass transition phenomena normally take place over a range of about 10° C. and often over a range of less than about 5° C. In any case, the resistivity and current control available in the use of the devices of the instant invention can be triggered either by the external or the internal application to or removal of heat from the polymeric composition. Thus, the necessary temperature changes required to effect regulation of current flow through the composition can be achieved, for instance, by heating the composition in an oven, refrigeration and the like. However, said temperatures can also be achieved from below the $T_g$ by generating heat within the composition due to increasing amounts of current flow therethrough. Thus, the devices of the invention can be utilized in somewhat the same manner than an ordinary fuse is operated provided, of course, that the maximum design current load of the circuitry is sufficient to bring the composition to within or through the aforementioned glass transition temperature range. When the circuitry is so designed a short circuit or similar burst of current flow will generate sufficient heat within the polymeric composition of the device to bring the temperature thereof to within or somewhat through the glass transition temperature range. The substantially increased resistivity resulting across the device will normally, for practical purposes, interrupt the flow of current. Upon cooling through said range, the resistivity across the device will decrease to previous levels and current flow is thereby reestablished.

A better understanding of the present invention can be obtained from the Examples, which, however, should be construed as being illustrative in nature and as not limiting the scope of the invention.

EXAMPLE 1

A polymeric composition comprising about 100 parts of polyvinyl acetate having dispersed therein about 40 parts of a conductive furnace black is molded into the shape of a resistor Said resistor having electrodes attached to each end is placed in an oven designed to provide controlled temperatures up to about 30° C. In initial measurements at 20° C., the resistivity of the resistor is found to be about 54 Ohm-cm. When the temperature of the resistor is raised to 25° C., the resistivity is found to have risen to about 72 Ohm-cm. When the temperature of the resistor is raised to 30° C., the resistivity is found to have risen to about 300 Ohm-cm. When, however, the temperature of the resistor is allowed to return to 20° C., the resistivity is found to have returned to about 54 Ohm-cm.

EXAMPLE 2

A dispersion consisting of 100 parts by weight of a low density polyethylene (0.940 g./cc.) and 50 parts by weight of a conductive furnace black was prepared by two roll milling. One half of the composition is removed from the mill and about 2 parts per hundred of the polymeric content of dicumyl peroxide is milled into the remaining composition. Next, each of the compositions is molded into a cylindrical resistor form having terminals emplaced at each end thereof. Those formed resistors comprising the dicumyl peroxide are cured at about 350° F. The resistor elements are then placed into an insulated thermal chamber equipped with a liquid nitrogen jacket and resistance heating coils. The terminals of the resistors are led through insulated leads from said chamber and the respective resistivities across the terminals thereof are continuously monitored. By means of injection of liquid nitrogen, the polymeric resistor elements are cooled to a temperature of about −200° and are then allowed to warm slowly to about ambient temperature. When the temperature has stabilized at about ambient, the chamber is then heated by means of the resistance heaters so as to provide a rate of temperature increase of the polymeric compositions of about 2° C. per minute. After the polymer resistance elements attain a temperature of about 140° C. the resistance heaters are shut down and the chamber allowed to cool at about ambient temperature (20° C.). The temperature/volume-resistivity character of the polymeric resistance elements is shown in the drawing forming part hereof. As will be noted, both the cured and uncured polymeric composition resistor elements display two well defined loci at which rapid increases in resistivity occur with respect to rising temperatures. However, the resistance phenomenon which occurs at about the crystalline melting point of the polymeric material, i.e. at about 130° C., is reproducible or practical substantially only when said material is cured. The uncured material collapses through deformation and breaks the circuitry and the resistivity thereof goes offscale permanently.

When the above experiment is repeated with the exceptions that only uncured carbon black filled polyethylene resistors are utilized and the temperature ranges employed are maintained at below the crystalline melting point of the polymer, the temperature/volume-resistivity characteristics displayed through the glass transition temperature range of the polymer are found to be substantially reproducible when approached both from above and below said glass transition temperature range. Of equal significance, the polymeric material can be cycled repetitively through the glass transition temperature range. Of equal significance, the polymeric material can be cycled repetitively through the glass transition temperature range and maintain substantially the same temperature/resistivity character throughout said cycling.

Obviously, many changes can be made in the above description and Examples without departing from the scope of the present invention.

For instance, polymeric compositions produced in accordance with the present invention can comprise in addition to the polymer and conductive filler, other additives normally added to such compositions. Thus, pigments and antioxidants as well as substantially nonconductive fillers can also be incorporated into said composition. Further, as is demonstrated in Example 2, the polymeric composition may be cured or crosslinked if so desired, without deleterious effect upon the temperature/resistivity character of the composition within the glass transition range of the polymeric material.

Moreover, devices of the present invention can be readily adapted with modification as desired and required in numerous other applications such as heating elements, process controls for heated and cryogenic processes as the like.

Accordingly, it will be understood that the above description and Example are illustrative in nature and in no way limit the scope of the present invention.

I claim:
1. A thermally responsive current regulating device comprising:
   a. at least two electrodes in electrical communication with a polymeric material-containing composition having a softening temperature at least about 15° C. higher than the glass transition temperature of said polymeric material, said composition comprising;
      i. a polymeric material, and
      ii. between about 10 and about 250 parts per hundred parts by weight of said polymeric material of an electrically conductive filler having an average particle diameter of less than about one micron; and
   b. means associated with said polymeric composition of (a) adapted to bring the temperature thereof to about the glass transition temperature of said polymeric material.
2. The device of claim 1 wherein said electrically conductive filler is chosen from the group consisting of carbon black, powdered metals, powdered metal alloys, or mixtures thereof.
3. The device of claim 1 wherein the quantity of said electrically conductive filler utilized represents between about 20 and about 100 parts by weight per hundred parts of said polymeric material.
4. The device of claim 1 wherein said electrically conductive filler is carbon black.
5. The device of claim 4 wherein said carbon black is acetylene black, furnace black, or mixtures thereof.
6. A process for the thermoregulation of electric current which comprises:
   a. flowing a current through a polymeric material-containing composition having a softening temperature at least about 15° C. higher than the glass transition temperature of said polymeric material said composition comprising;
      i. a polymeric material, and
      ii. between about 20 and about 250 parts per hundred parts by weight of said polymeric material or an electrically conductive filler having an average particle diameter of less than about one micron; and
   b. bringing the temperature of said composition to about the glass transition temperature of said polymeric material.
7. The process of claim 6 wherein said electrically conductive filler is carbon black.
8. The process of claim 6 wherein step (b) is achieved by increasing the current flow through said composition sufficiently to raise the temperature thereof to at least said glass transition temperature of the polymeric material.